US012780532B2

(12) United States Patent
Bisio

(10) Patent No.: US 12,780,532 B2
(45) Date of Patent: Nov. 3, 2026

(54) CUP AND CAPSULE FOR THE PREPARATION OF BEVERAGES

(71) Applicant: BISIO PROGETTI S.P.A., Alessandria (IT)

(72) Inventor: Stefano Bisio, Alessandria (IT)

(73) Assignee: BISIO PROGETTI S.P.A., Alessandria (IT)

( * ) Notice: Subject to any disclaimer, the term of this patent is extended or adjusted under 35 U.S.C. 154(b) by 300 days.

(21) Appl. No.: 18/274,017

(22) PCT Filed: Mar. 22, 2022

(86) PCT No.: PCT/IB2022/052588
§ 371 (c)(1),
(2) Date: Jul. 25, 2023

(87) PCT Pub. No.: WO2022/219436
PCT Pub. Date: Oct. 20, 2022

(65) Prior Publication Data

US 2024/0425269 A1 Dec. 26, 2024

(30) Foreign Application Priority Data

Apr. 14, 2021 (IT) ........................ 102021000009392

(51) Int. Cl.
*B65D 85/804* (2006.01)
*B32B 27/08* (2006.01)
(Continued)

(52) U.S. Cl.
CPC .......... *B65D 85/8052* (2020.05); *B32B 27/08* (2013.01); *B32B 27/306* (2013.01);
(Continued)

(58) Field of Classification Search
CPC .............. B65D 2565/387; B65D 65/40; B65D 85/8052; B65D 85/084; B32B 2250/03
(Continued)

(56) References Cited

U.S. PATENT DOCUMENTS

2017/0367521 A1* 12/2017 Conant ............... A47J 31/3676
2020/0223623 A1 7/2020 Schenone
2022/0016875 A1* 1/2022 Fortin ..................... B32B 27/40

FOREIGN PATENT DOCUMENTS

KR 20097021583 * 2/2010 .............. A47J 31/40
KR 20100015623 A * 2/2010 ......... B65D 85/8052
(Continued)

OTHER PUBLICATIONS

International Search Report, issued in PCT/IB2022/052588, mailed Jul. 14, 2022, Rijswijk, NL.

*Primary Examiner* — Anthony D Stashick
*Assistant Examiner* — Raven Collins
(74) *Attorney, Agent, or Firm* — ArentFox Schiff LLP; Michael Fainberg

(57) ABSTRACT

A co-extruded cup made of plastic material, for producing a capsule for preparing infusion or soluble beverages is provided. The co-extruded cup has an inlet opening defined by an upper edge, a bottom provided with an outlet opening defined by a nozzle, and an inner base with a plurality of vertically protruding ridges. The co-extruded cup has a multi-layer wall having an outer layer, an inner layer and an intermediate gas-barrier layer extending from the upper edge to the nozzle. The bottom is devoid of radial reinforcing flaps, and the intermediate gas-barrier layer homogenously extends without interruptions from the upper edge to the nozzle.

9 Claims, 6 Drawing Sheets

(51) Int. Cl.
*B32B 27/30* (2006.01)
*B32B 27/32* (2006.01)
*B32B 27/36* (2006.01)
*B65D 65/40* (2006.01)

(52) U.S. Cl.
CPC .............. *B32B 27/32* (2013.01); *B32B 27/36* (2013.01); *B65D 65/40* (2013.01); *B65D 85/8049* (2020.05); *B32B 2250/03* (2013.01); *B32B 2250/24* (2013.01); *B32B 2250/40* (2013.01); *B32B 2307/7163* (2013.01); *B32B 2439/70* (2013.01); *B65D 2565/387* (2013.01)

(58) Field of Classification Search
USPC .......................................................... 220/626
See application file for complete search history.

(56) References Cited

FOREIGN PATENT DOCUMENTS

| | | | | |
|---|---|---|---|---|
| WO | WO-2016193961 | A2 * | 12/2016 | ......... B65D 85/8061 |
| WO | 2018154437 | A1 | 8/2018 | |
| WO | 2019064096 | A1 | 4/2019 | |
| WO | 2020245685 | A1 | 12/2020 | |

* cited by examiner

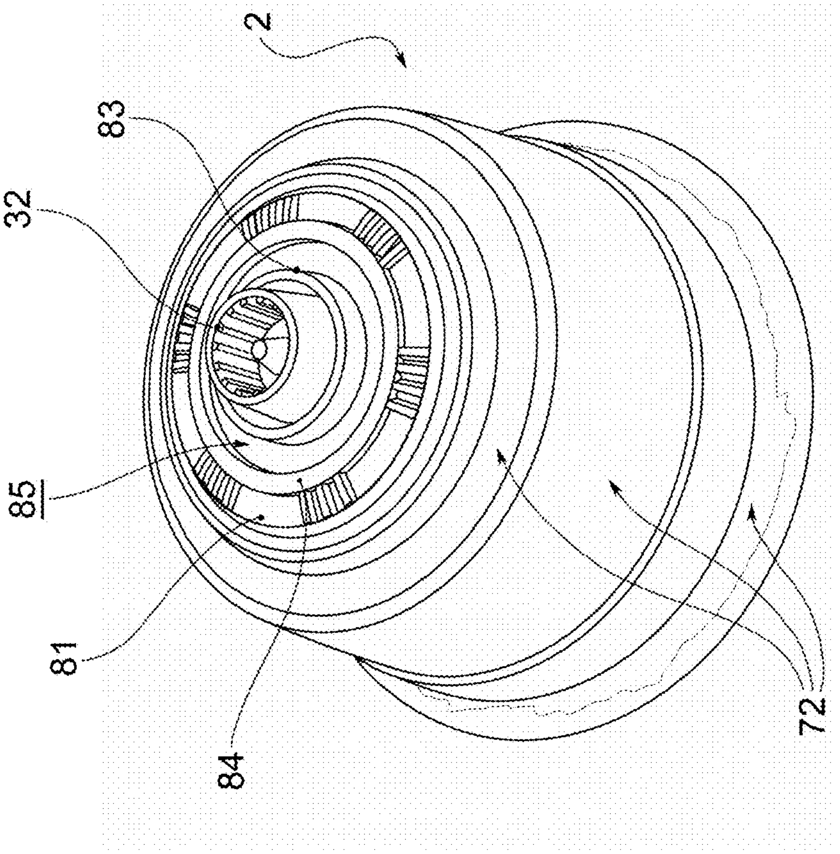
FIG.6b
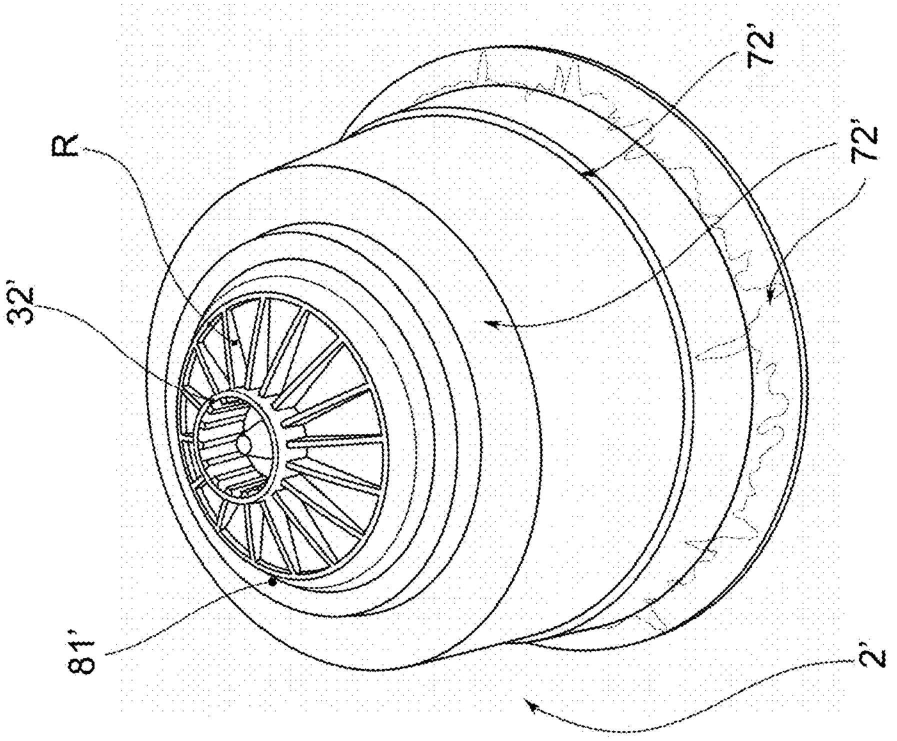
FIG.6a - Prior art

FIG.7a - Prior art

CUP AND CAPSULE FOR THE PREPARATION OF BEVERAGES

CROSS-REFERENCE TO RELATED APPLICATIONS

This application is a National Phase Application of PCT International Application No. PCT/IB2022/052588, having an International Filing Date of Mar. 22, 2022 which claims priority to Italian Application No. 102021000009392 filed Apr. 14, 2021, each of which is hereby incorporated by reference in its entirety.

FIELD OF THE INVENTION

The present invention relates cup (also referred to as small cup) made of plastic material for producing a capsule for preparing infusion or soluble beverages. The present invention also relates to the capsule obtained by means of said cup, usable for packaging concentrated products (for example in the form of powder, granules, leaves) in predetermined and single doses, for the spontaneous preparation of beverages (such as tea, coffee, herbal tea, milk, chocolate, etc.) by the introduction, within the capsule itself, of a fluid under pressure (mostly hot water).

BACKGROUND OF THE INVENTION

In the field of capsules or pods for coffee or other infusions, the use of "self-protected" or "barrier" capsules is known, i.e. able to guarantee the preservation of the organoleptic features of the food substance contained therein, protecting it from external agents such as gas etc., without the need to be wrapped in a protective wrapping (such as an aluminum bag).

It is known in the field to make capsules using cups (i.e., the body of the capsule inside which the food substance to be infused or dissolved is contained) obtained by injection molding of polymeric material such as polybutylene terephthalate (PBT), known to give high airtightness so as not to disperse the aroma of the mixture, as well as to create an effective barrier against oxygen and humidity and guarantee a long shelf-life to the product. However, some studies seem to have highlighted some drawbacks linked to the use of such material, linked to the risk of releasing toxic substances in contact with boiling water.

Therefore, in the field it is known to produce capsules using cups obtained by thermoforming in multi-layer material having an intermediate barrier layer, for example in ethylene vinyl alcohol (EVOH), which protects the food substance from air, light and humidity. However, even this production technique has some drawbacks, linked to a non-constant and uniform distribution of the plastic material in the sinuosity of the mold, which prevents the creation of articulated and complex geometries. In fact, thermoforming is not very suitable for making cups with complex geometries at the bottom, such as, for example, anti-dripping labyrinth portions or integrated opening means.

It is therefore known in the field to manufacture capsules using cups having precisely such complex geometries integrated in the bottom, but to be manufactured means of co-extrusion. Such method involves injecting simultaneously into the mold cavity several layers of different materials which form a multi-layer wall, generally with an outer layer, an inner layer intended to come into contact with the food chamber and an intermediate layer of the barrier type. An example of such known cups is described in WO 2019/064096 A1, again in the name of the holder. Among the most complex aspects in the production of such co-extruded cups is the proper and uniform distribution of the intermediate barrier layer. In fact, the presence of complex geometries integrated in the bottom or of radial reinforcing flaps on the bottom generates turbulence in the injection flow which negatively affects the distribution of the intermediate barrier layer. The intermediate layer may in fact have very thinned areas, or thickened areas, or emerge towards the outer layer or the inner layer. All these very frequent cases involve a series of problems. For example, in the case of very thinned areas, the ability of the intermediate layer to provide a proper barrier to oxygen is compromised. In order to remedy this defect, considered unacceptable in the sector, the quantity of barrier material injected into the mold is increased. However, since such material is the most expensive in the multi-layer, this fallback solution considerably increases the production costs of the cup and of the entire capsule. Furthermore, very often the inhomogeneity of the intermediate barrier layer reaches the upper edge of the cup intended for sealing the cover. A frequent defect in these cases is the surfacing of the barrier layer at the upper edge, which compromises the sealing of the cover. This defect is also considered unacceptable in the industry.

SUMMARY OF THE INVENTION

The object of the present invention is to provide a cup for producing capsules for preparing infusion or soluble beverages which solves the drawbacks of the prior art taking into account the needs of the industry.

In particular, the object of the present invention is to provide a cup which is provided with a barrier and at the same time is safe for health, which allows having the complex and articulated geometries necessary for an optimal dispensing of the beverage and at the same time a proper and homogeneous distribution of the intermediate barrier layer.

Such object is achieved by a cup made by co-injection molding provided with a bottom geometry which guarantees a uniform distribution of the intermediate barrier layer up to the upper edge.

Such object is achieved by a cup and by a capsule obtained with said cup as described and claimed herein. Preferred embodiments of the present invention are also described.

BRIEF DESCRIPTION OF THE FIGURES

The features and the advantages of the cup according to the present invention will appear more clearly from the following description, made by way of an indicative and non-limiting example with reference to the accompanying figures, in which:

FIG. 6B shows the homogeneous distribution of the intermediate barrier layer of the cup according to the present invention (in the example of FIG. 4A), in comparison with FIG. 6A, which shows the inhomogeneous distribution of the intermediate barrier layer of a cup of the prior art provided with radial reinforcing flaps;

FIGS. 7A and 7B show the upper portion of the cup of the prior art of FIGS. 6A, respectively, compared with the upper portion of the cup of FIG. 6B according to the present invention.

DETAILED DESCRIPTION

Figure 1:
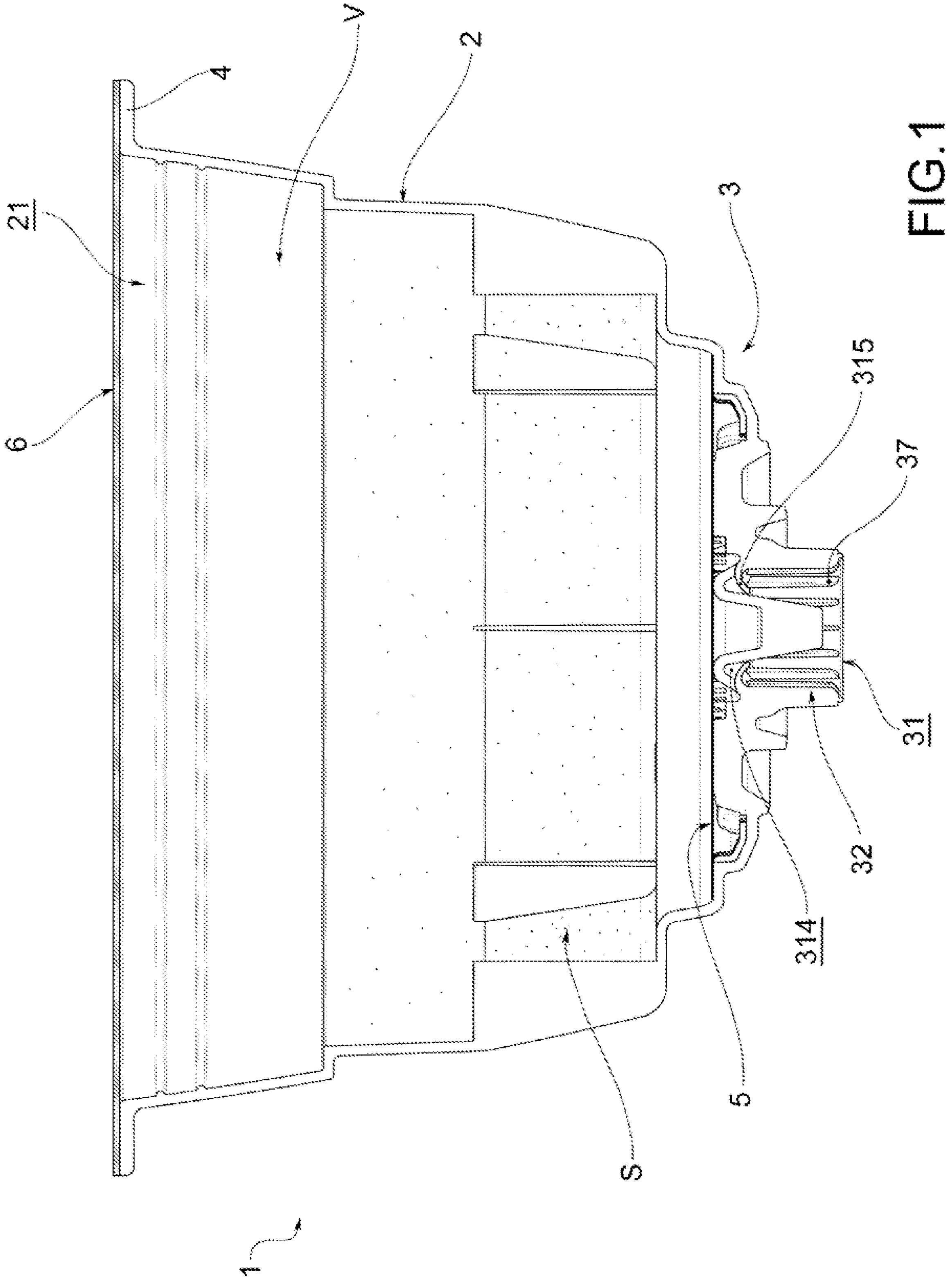
FIG. 1 shows a sectional view of a cup according to the present invention (embodiment example of FIG. 4A), used as a containment body of a capsule according to the present invention for preparing infusion or soluble beverages.

With reference to the accompanying figures, the reference numeral 2 indicates a cup adapted to define an internal volume V for containing at least one substance S to be infused or dissolved, typically in powder or granular form. Said cup 2 may be used for producing a capsule for preparing infusion or soluble beverages, indicated with the reference numeral 1.

As shown in FIG. 1, the cup 2 is provided, on one side, with a bottom 3 and, on the opposite side, with an inlet opening 21 defined by an upper edge 4 protruding outwardly. The cup 2 is provided externally, at the bottom 3, with an outlet opening 31, defined by a nozzle 32, suitable for allowing the infused beverage to flow out. The cup 2 is internally provided, at the bottom 3, with an inner base 33.

The base 33 is provided with a plurality of ridges 30, 90, 310, 360 protruding vertically with respect to the base 33 itself, towards the inside of the cup 2.

The base 33 comprises a central portion 310, defined by a ridge, covering the outlet opening 31 of the nozzle 32.

The base 33 comprises a peripheral edge 360, defined by a ridge, on which it is possible to secure a sealing disk 5.

Preferably, the base 33 comprises supports 90, defined by ridges, adapted to keep the disk 5 raised so that it does not obstruct the flow of the beverage towards the nozzle 32.

In one embodiment, the upper surface of the ridges 30, 90, 310, 360 is substantially flat and devoid of cutting or puncture or tearing elements. In such embodiment example, the opening of the capsule 1 is caused by the at least partial detachment of the disk 5 from the peripheral edge 360, or by the bursting collapse of some portions of the disk 5 provided with suitable weakenings.

In a different embodiment example, at least the upper surface of some of the ridges, for example of the supports 90, is provided with cutting or puncture or tearing profiles. In such embodiment example, the opening of the capsule 1 is caused by the perforation of the disk 5 by means of the opening means represented by the supports 90.

Preferably, the base 33 comprises a labyrinth 30, formed by at least one ridge, adapted to prevent the passage of the infused beverage towards the nozzle 32 by means of capillarity when the pressure inside the capsule 1 drops below a threshold value, or it stops completely when the capsule 1 is disengaged from the brewing group of the machine.

The cup 2 is made of plastic material, by means of co-injection molding, i.e. several layers of different materials are simultaneously injected into the mold cavity, which fill said cavity, creating a multi-layer wall 7. As may be seen in FIG. 4B, the cup 2 has a multi-layer wall 7, having an outer layer 71, an inner layer 73 intended to come into contact with the food chamber S, and an intermediate layer 72 of the barrier type. Advantageously, the intermediate layer 72 forms a barrier to gases, in particular oxygen.

Figure 5:
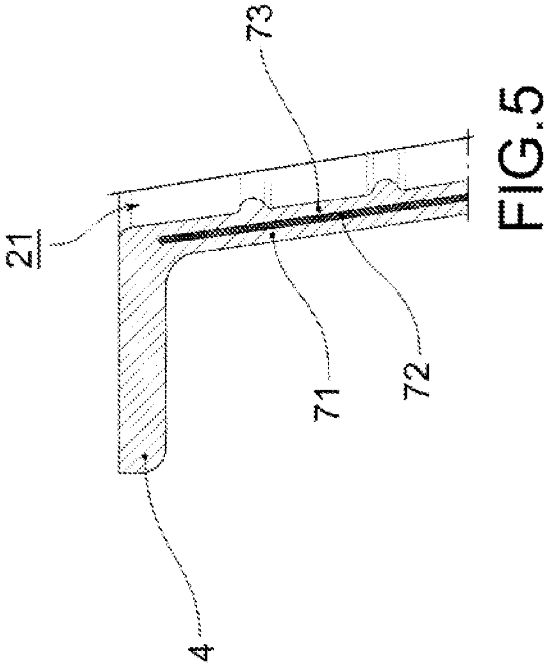
FIG. 5 shows a sectional view of an upper portion of the cup according to the present invention.

As may be seen in FIG. 5, the multi-layer wall 7, and in particular the intermediate barrier layer 72, extends without interruption from the upper edge 4 (excluded) to the nozzle 32 (excluded), also inside the inner base 33 and the central pin 312.

Preferably, the intermediate layer is made of ethylene-polyvinyl alcohol (EVOH) or polyvinyl alcohol (PVOH).

Preferably, both the outer layer and the inner layer are made of polypropylene (PP), or polyethylene (PE), or polylactic acid (PLA). Therefore, the material that forms the entire layer 73 and the outer layer 71 is a non-barrier material, belonging to the family of polyolefins, of the inert and food-compatible type.

In an embodiment example (PP-EVOH-PP), the cup 2 is multi-layer consisting of an outer layer made of polypropylene, an intermediate barrier layer made of ethylene-polyvinyl alcohol, and an inner layer made of polypropylene.

In an embodiment example (PE-EVOH-PE), the cup 2 is multi-layer consisting of an outer layer made of polyethylene, an intermediate barrier layer made of ethylene-polyvinyl alcohol, and an inner layer made of polyethylene.

In a still further embodiment example, the cup 2 is biodegradable and compostable. In such embodiment example (PLA-PVOH-PLA), the cup 2 is multi-layer consisting of an outer layer made of polylactic acid, an intermediate barrier layer made of polyvinyl alcohol, and an inner layer made of polylactic acid.

As mentioned above, the cup 2 is made by means of the co-injection molding technique which, while allowing complex and articulated geometries to be obtained, often presents problems in relation to the uniformity and homogeneity of distribution of the intermediate barrier layer 72. To ensure uniformity of distribution of the intermediate barrier layer, the cup 2 is provided with a particular outer geometry of the bottom 3, shown in different embodiment variants in FIGS. 2A, 3 and 4A.

The bottom 3 of the cup 2 comprises: an outer edge 86, corresponding to the peripheral edge 360, followed by an annular support portion 81, both intended to come into contact with the infusion chamber of the injection machine; a depression 85 for connection to the nozzle 32. The support portion 81 is inclined towards the nozzle 32. The depression 85 is located below the labyrinth 30, where present.

The bottom 3 of the cup 2, between the support portion 81 and the nozzle 32, i.e. at the depression 85, is devoid of radial reinforcing flaps R, present in the capsules of the prior art and visible for example in FIG. 6A. In their place, the bottom 3 of the cup 2 is provided with at least one reinforcing ring between the support portion 81 and the nozzle 32, that is to say at the depression 85.

Figure 2B:
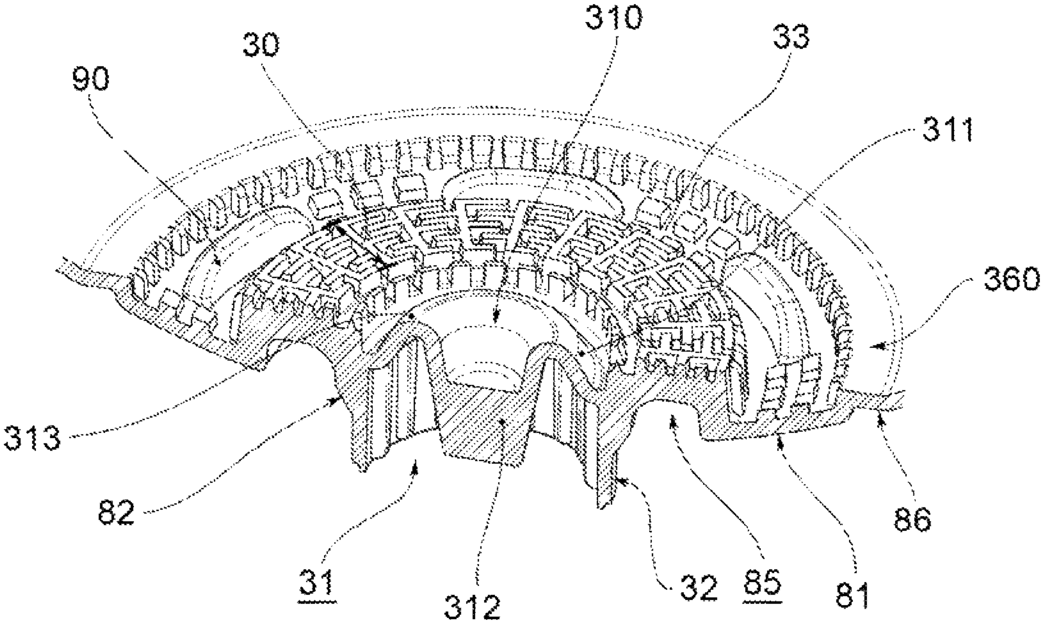
FIGS. 2A and 2B show the bottom of a cup according to the present invention, in an external bottom view and in a sectional view, respectively, in an embodiment example.
Figure 2A:
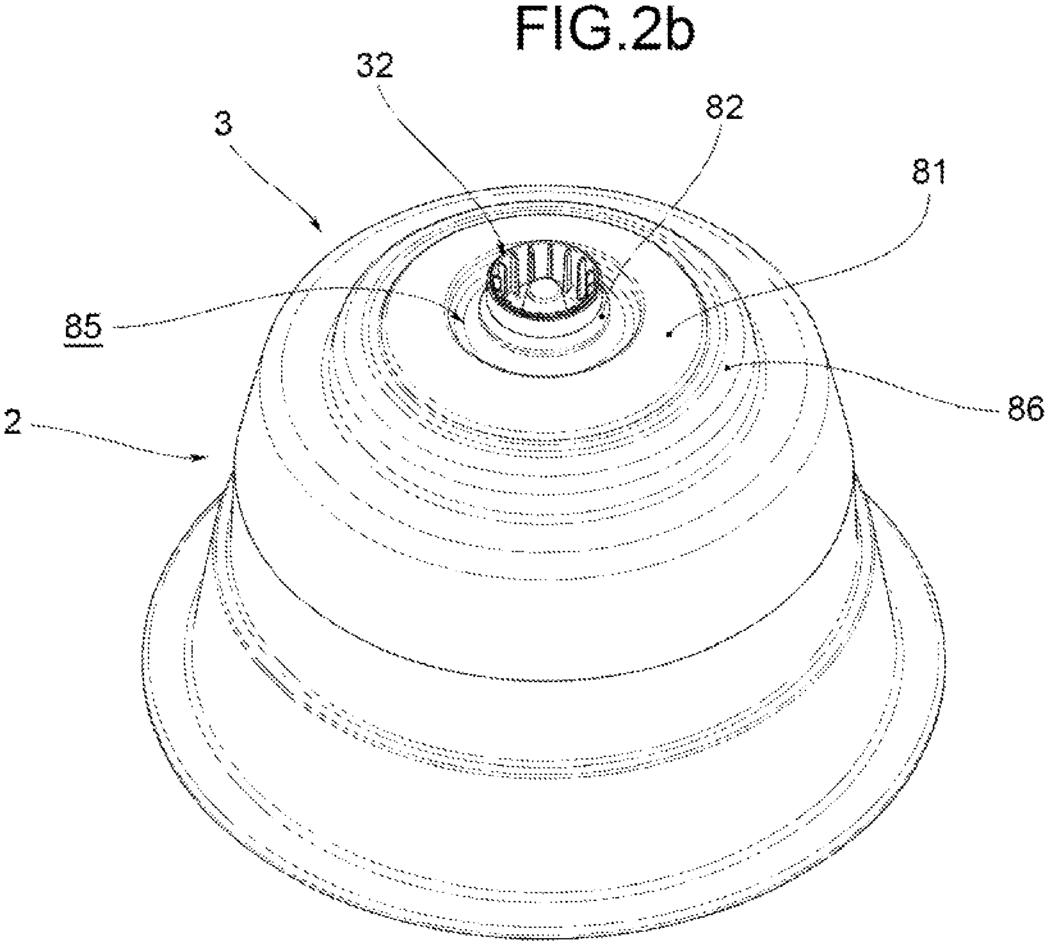
Figure 3:
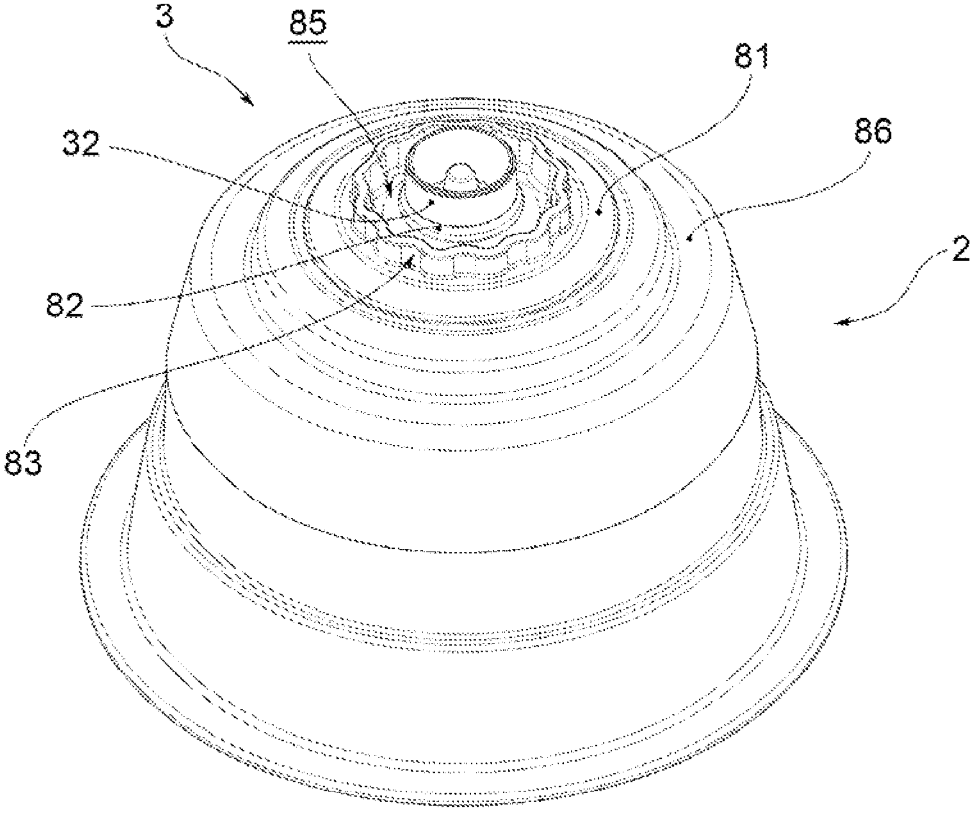
FIG. 3 shows an external bottom view of the bottom of a cup according to the present invention, in a further embodiment example.
Figure 4A:
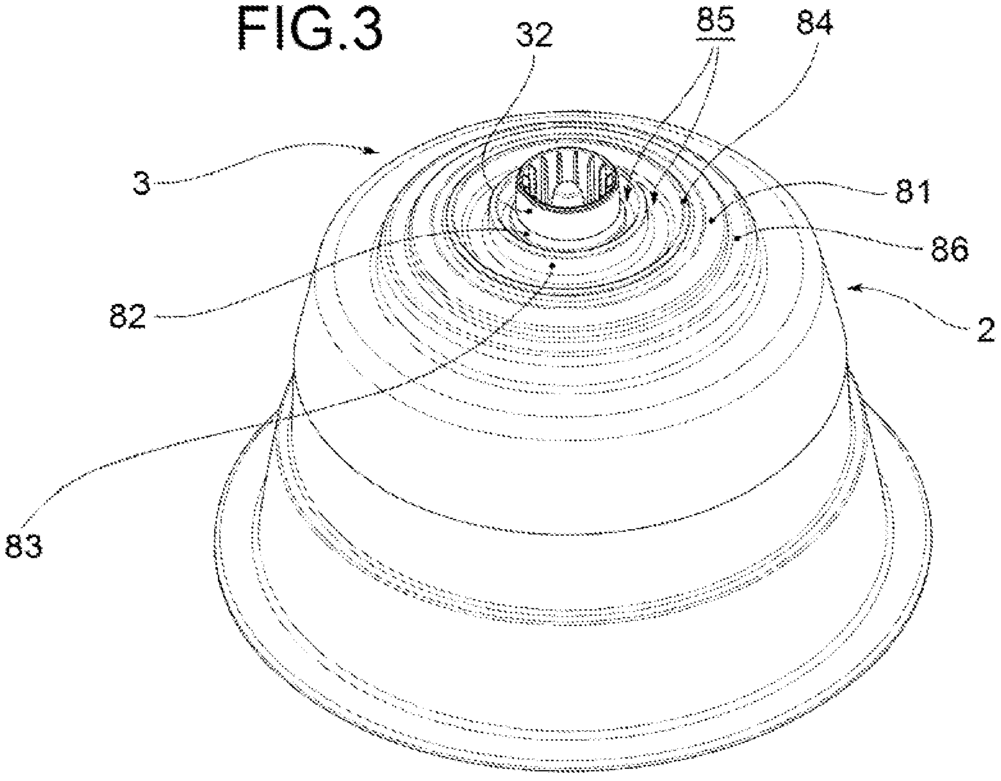
FIGS. 4A and 4B show the bottom of a cup according to the present invention, in an external bottom view and in a sectional view, respectively, in a still further embodiment example.

In an embodiment example, shown in FIGS. 2A, 3 and 4A, the reinforcing ring is a continuous annular inner ridge 82, extending from the bottom 3 and adhering to the nozzle 32.

In an embodiment example, shown in FIGS. 3 and 4A, the reinforcing ring is a continuous annular central ridge 83, extending from the bottom 3 inside the depression 85. The central ridge 83 may be cylindrical as in FIG. 4A, or wavy as in FIG. 3. The central ridge 83 has an axial extension which allows it to come into contact with the infusion chamber of the injection machine to provide structural strength to the bottom 3 of the cup 2.

In an embodiment example, shown in FIG. 4A, the reinforcing ring is a continuous annular outer ridge 84, extending from the bottom 3 towards the support portion 81. The outer ridge 84 has an axial extension which allows it to come into contact with the infusion chamber of the injection machine to provide structural strength to the bottom 3 of the cup 2.

Instead of the radial reinforcing flaps R, the bottom 3 of the cup 2 has been thickened at least at the depression 85. For example, the wall thickness at the depression 85 is between 0.8 and 1.2 mm, compared to a wall thickness of about 0.5 mm in the rest of the cup 2.

Advantageously, the particular geometry of the bottom 3 of the cup 2, without radial reinforcing flaps, allows a homogeneous distribution of the intermediate barrier layer 72 to be obtained even in the presence of complex geometries integrated in the bottom 3, represented by the ridges 30, 90, 310 of the inner base 33.

Advantageously, the particular geometry of the bottom 3, provided with thickenings and/or reinforcing rings, ensures the cup 2 the necessary mechanical and structural strength to withstand the high dispensing pressures to which the capsule is subjected during use without deforming.

FIGS. 6A and 7A show a cup 2' of the prior art, provided with radial reinforcing flaps R at the bottom. The images highlight the uneven distribution of the intermediate barrier layer 72', which h has a strong alternation of thinned and thickened areas. At the upper welding edge 4' (FIG. 7A), the jagged pattern of the intermediate barrier layer 72', which has recesses in the wall and surfacing peaks on the upper edge 4', is evident.

Figure 7B:
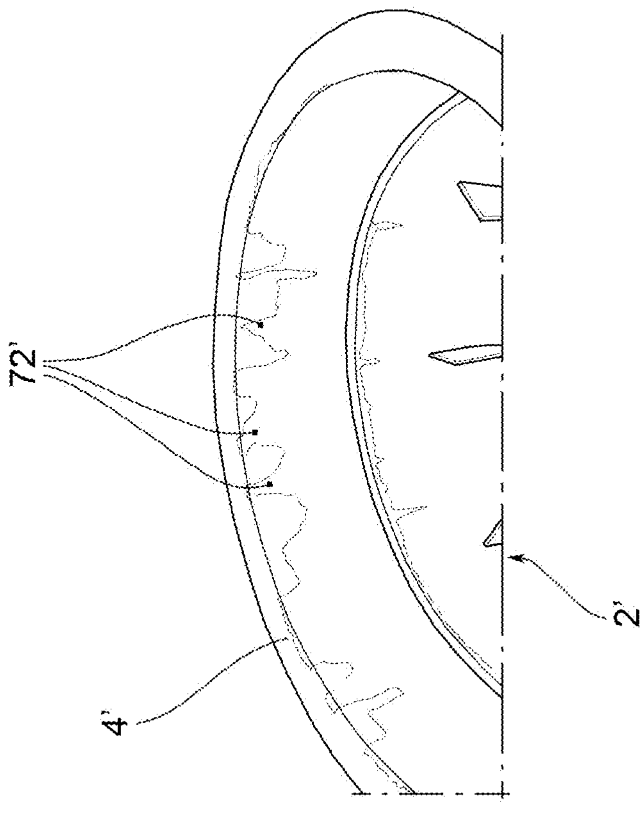
Figure 7B:
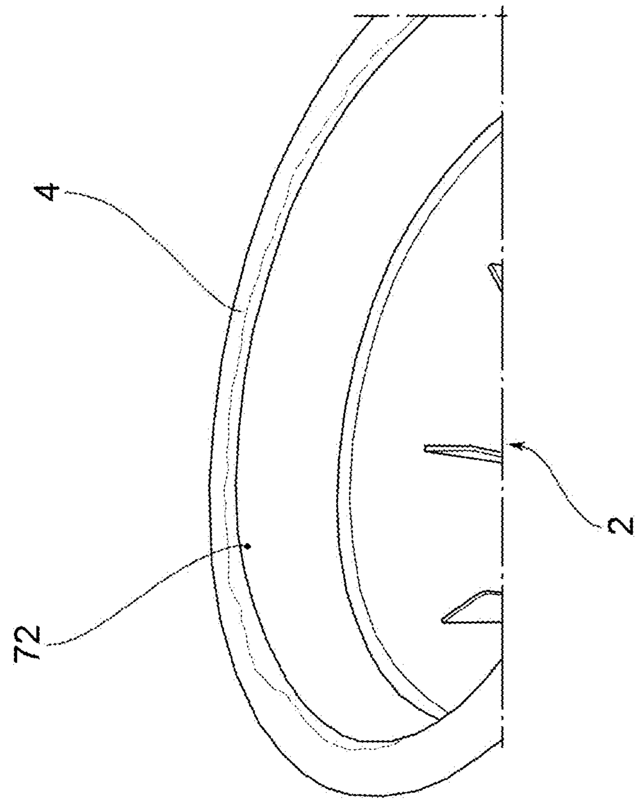

FIGS. 6B and 7B instead show a cup 2 according to the present invention, devoid of the radial reinforcing flaps at the bottom. The images highlight the homogeneous distribution of the intermediate barrier layer 72 for the whole cup. At the upper welding edge 4 (FIG. 7B), the continuous pattern of the intermediate barrier layer 72, which ends just before the edge with a continuous profile, is evident. Advantageously, a cup 2 according to the present invention is devoid of thinned areas, always guaranteeing the ability of the intermediate layer to provide a proper barrier to oxygen, without the need for greater quantities of such highly expensive material. Furthermore, a cup 2 according to the present invention is devoid of surfacing of the barrier layer at the upper edge, ensuring an optimal sealing of the cover 6.

Figure 4B:
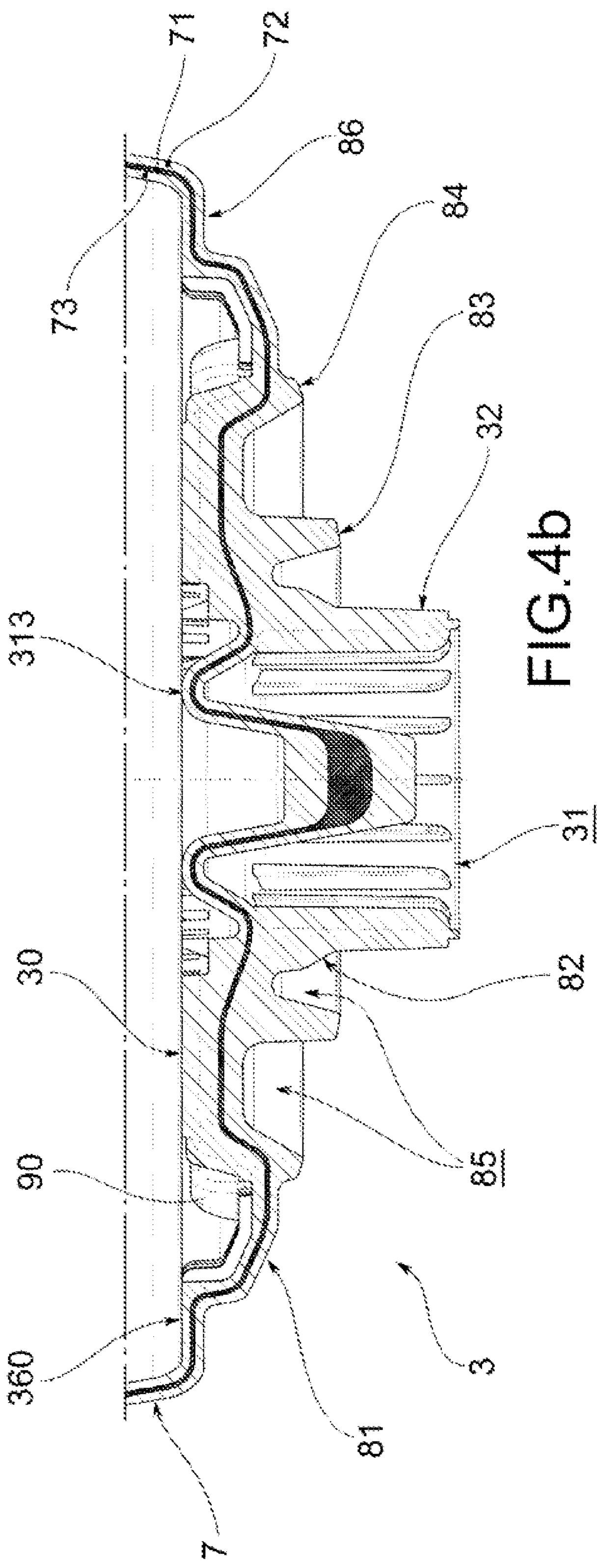

As mentioned above, the cup 2 is made by means of the co-injection molding technique which, while allowing complex and articulated geometries to be obtained, does not allow the creation of openings in the wall directly during the molding step. Therefore, the cup 2 is initially molded into a single body, without interruptions or openings in the wall, and has a completely closed central portion 310, as seen in FIGS. 2B and 4B. The central portion 310 is a continuous wall, which completely closes the opening 31.

Preferably, the central portion 310 comprises an outer circular crown 311, which implements the connection with the rest of the inner base 33, a flat portion 313, which provides a stop for fixing a sealing disk 5, and a central pin 312, which extends into the outlet opening 31 and the nozzle 32.

Subsequently, the cup 2 is sheared (or cut, or perforated) at the central portion 310 to create openings 314 in said central portion 310, in particular in the outer circular crown 311. Following the shearing step, as seen in FIG. 1, the central portion 310 has a plurality of connection openings 314 between the inside of the cup 2 and the outlet opening 31, to allow the infused beverage to flow towards the outside of the capsule 1. In an embodiment example, the shearing step provides a first step of cutting the central portion 310 and a subsequent step of bending the central portion 310 to form a plurality of flaps 315.

Preferably, the inner wall of the nozzle is provided with a plurality of vertical flaps 37, uniformly arranged in the circumferential direction, adapted to convey the flow of the infused beverage towards the outlet opening 31.

FIG. 1 shows the cup 2 at the end of the production step, i.e. in which the central portion 310 is provided with a plurality of connecting openings 314 between the inside of the cup 2 and the outlet opening 31. Such cup 2 may be used for producing a capsule 1 for preparing an infused or soluble beverage.

The capsule 1 comprises a cover 6 fixed, by gluing or welding, at the upper edge 4, adapted to seal the cup 2 at the top.

The capsule 1 is internally provided with a sealing disk 5 placed at the base 33 and adapted to seal the cup 2 at the bottom. The capsule 1 is then provided with a closed chamber, defined at the top by the cover 6 and at the bottom by the disk 5, inside which the substance S to be infused or dissolved is contained. The presence of a hermetically closed chamber is important for the good preservation and conservation of the substance. The disk 5 is positioned beneath the substance 11 and above the base 33.

The disk 5 is made of plastic material, multi-layer or single layer, or of plastic/aluminum composite material, or of aluminum.

The disk 5 is fixed internally to the cup 2, at the base 33, at least on the upper surface of the peripheral edge 360, on the labyrinth 30 where present, and on the central portion 310.

In an embodiment example, the disk 5 is welded through the use of a thermo-activatable material (a lacquer, a glue, a lower polymeric layer in the case of a multi-layer disk) with a low level of adhesion, so as to allow the detachment or ungluing thereof from the base 33, and in particular from the peripheral edge 360, due to the increase in temperature and pressure inside the capsule 1.

In a different embodiment example, the disk 5 is permanently welded on the peripheral edge 360 and is opened by perforation or tearing by means of opening means.

The capsule 1 may be made in different versions, for example for the preparation of infusion beverages (such as coffee) or soluble beverages.

Preferably, the coffee capsule 1 comprises a filter fixed, underneath the substance S, at the inner walls of the cup 2, just above the disk 5. The presence of the filter, preferably made of paper or non-woven fabric (TNT), allows the infused liquid to be filtered before it comes out of the capsule 1.

Preferably, the coffee capsule 1 further comprises a permeable or micro-perforated film, fixed at a certain distance above the substance S, on suitable horizontal abutments provided inside the cup 2. The presence of such film, which allows the passage of the fluid under pressure but not the passage of the substance 11, prevents the dispersion of the coffee powder during the infusion step, improving the quality of the infused beverage.

In the case of a capsule for the preparation of soluble beverages, such as for example chocolate or milk, the capsule 1 comprises the cover 6 and the sealing disk 5, and is devoid of the filter and of the permeable or micro-perforated film.

The capsule 1, in its various embodiments, may be used for the extemporaneous preparation of beverages (such as tea, coffee, herbal teas, milk, chocolate, etc.) by means of automatic or semi-automatic machines provided with a dispensing group adapted to produce an infusion by the passage of hot water under pressure through the capsule 1.

Innovatively, a cup according to the present invention allows a capsule provided with complex and articulated geometries to be obtained, necessary for an optimal dispensing of the beverage, and at the same time has a proper and homogeneous distribution of the intermediate barrier layer.

Advantageously, the bottom of the cup according to the present invention, devoid of radial reinforcing flaps, allows a homogeneous distribution of the intermediate barrier layer which is devoid of thinned areas to be obtained, guaranteeing a proper barrier to oxygen without the need for greater quantities of such expensive material, and without surfacing at the upper edge, ensuring an optimal sealing of the cover.

Advantageously, the bottom of the cup according to the present invention, provided with thickenings and/or reinforcing rings, ensures the necessary mechanical and structural strength to withstand the high dispensing pressures to which the capsule is subjected during use.

It is clear that those skilled in the art may make changes to the cup for capsules for preparing infusion or soluble beverages described above, all falling within the scope of protection as defined by the following claims.

What is claimed is:

1. A co-extruded cup made of plastic material, for producing a capsule for preparing infusion or soluble beverages, comprising:

an inlet opening, defined by an upper edge;

a bottom comprising an outer edge, an outlet opening defined by a nozzle, and an intermediate annular support portion;

an inner base comprising a plurality of vertically protruding ridges; and a multi-layer wall comprising an outer layer, an inner layer and an intermediate gas-barrier layer, wherein said intermediate gas-barrier layer extends from the upper edge to the nozzle; and wherein the bottom, between the intermediate annular support portion and the nozzle, is devoid of radial reinforcing flaps, and the intermediate gas-barrier layer homogenously extends without interruptions from the upper edge to the nozzle; and wherein the upper edge and/or the nozzle is devoid of the intermediate gas-barrier layer.

2. The co-extruded cup of claim 1, wherein the bottom, between the intermediate annular support portion and the nozzle, has a wall thickness between 0.8 mm and 1.2 mm.

3. The co-extruded cup of claim 1, wherein the bottom, between the intermediate annular support portion and the nozzle, is provided with at least one reinforcing ring.

4. The co-extruded cup of claim 3, wherein the at least one reinforcing ring is a continuous annular inner ridge extending from the bottom and adhering to the nozzle.

5. The co-extruded cup of claim 3, wherein the at least one reinforcing ring is a continuous annular central ridge extending from the bottom between the intermediate annular support portion and the nozzle.

6. The co-extruded cup of claim 3, wherein the at least one reinforcing ring is a continuous annular outer ridge extending from the bottom towards the intermediate annular support portion.

7. The co-extruded cup of claim 1, wherein the intermediate gas-barrier layer is made of ethylene vinyl alcohol (EVOH) or polyvinyl alcohol (PVOH).

8. The co-extruded cup of claim 1, wherein both the outer layer and the inner layer are made of one of polypropylene (PP), polyethylene (PE), or polylactic acid (PLA).

9. The co-extruded cup of claim 1, wherein the intermediate gas-barrier layer extends into the inner base and into a central pin arranged inside the nozzle.

* * * * *